Aug. 9, 1938.                I. H. RISSER                2,126,505
                    JOINT CONSTRUCTION FOR CONDUITS
                         Filed June 15, 1937
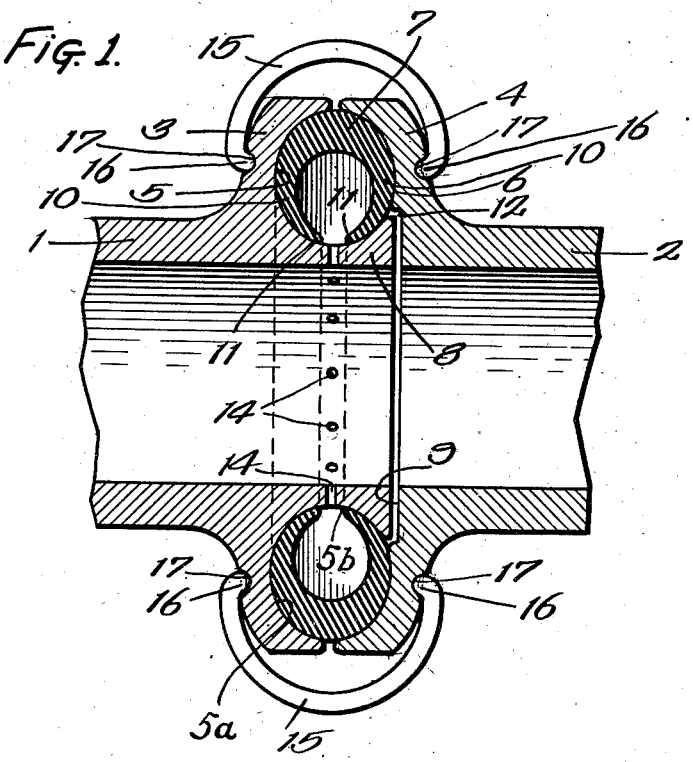
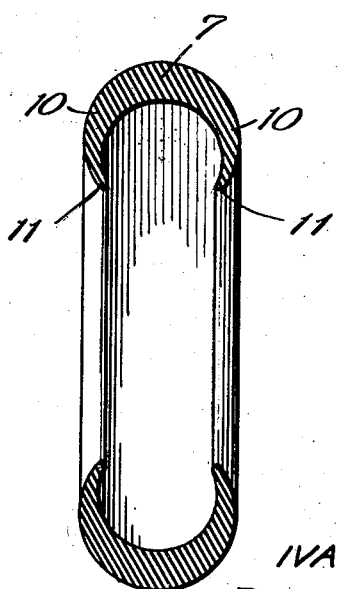
INVENTOR:
IVAN H. RISSER
BY John H. Nelson
        ATTY.

Patented Aug. 9, 1938

2,126,505

UNITED STATES PATENT OFFICE 2,126,505

JOINT CONSTRUCTION FOR CONDUITS

Ivan H. Risser, Chicago, Ill., assignor to U. S. Bottlers Machinery Company, Chicago, Ill., a corporation of Illinois Application June 15, 1937, Serial No. 148,316

4 Claims. (Cl. 285—129)

This invention relates to joint construction for conduits employed to convey fluid under pressure, and has for its main object the provision of such a joint structure embodying an improved sealing member of resilient material, that will be responsive to pressure in the conduit to effectively seal the joint while permitting a certain amount of relative movement between the joined sections of the conduit, in the event the sections expand or contract under the influence of varying temperatures of the fluid conveyed thereby.

The object of the invention and the advantages attained thereby will become more apparent by reference to the specification and the accompanying drawing, in which:

Fig. 1 is a sectional view of a portion of a jointed conduit embodying the joint structure of the invention.

Fig. 2 is a sectional view of the sealing member of the invention, illustrating the normal shape of the member before it is assembled with the joint.

The joint structure, as illustrated, includes joined conduit sections 1 and 2 which are provided with laterally enlarged adjacent ends 3 and 4, respectively, in which are respectively formed concentric annular recesses or concavities 5 and 6 forming an annular chamber therebetween in which is snugly confined, under compression, an internally hollowed-out annular gasket 7 of resilient material, such as rubber. The conduit section 1 has an end extension 8 adapted to be loosely received within an annular depression 9 in the end of the conduit section 2 for maintaining the conduit sections substantially in coaxial alignment.

The concavity 6 and a portion 5a of the concavity 5 form opposite side-walls of the chamber, with the concavity 5 having a portion 5b continuing from the portion 5a in the form of a peripheral groove in the end-extension 8, and forming an inner concaved wall portion of the chamber.

The gasket is normally crescent-shaped in cross-section, as seen in Fig. 2, with arcuate side-wall portions 10 adapted to engage the side-walls of the chamber, and being tapered toward the central opening of the gasket to terminate in thin edge portions 11 adapted to be confined in a contracted relation with respect to each other within the inner-wall portion 5b of the chamber.

In the end-extension 8 of the conduit section 1 is a series of annularly arranged apertures 14 arranged to register between the spaced edge portions of the side-walls of the gasket, whereby pressure of fluid passing through the conduit sections will be admitted into the interior of the gasket and cause its side walls to be pressed into sealing engagement with the walls of the concavities of the conduit sections.

The conduit sections are resiliently connected, so as to cause the side-walls of the gasket to be compressed therebetween, while permitting relative movement of the sections due to expansion or contraction thereof, by means of U shaped spring elements or clamps 15 arranged to straddle the enlarged ends of the sections at equally spaced locations thereabout. The clamps 15 are held in position on the conduit sections by having inturned ends 16 adapted to be received in notches 17 in the sides of the enlarged portions of the sections.

The end-extension 8 of the conduit section 1 is of such diameter that the gasket may be easily forced thereover and snapped into position within the concavity 5 of the said section.

The peripheral groove portion 5b in the end-extension 8 is of such curvature, in cross-section, that when the gasket is snapped into the concavity 5, the side-walls of the gasket will be deflected toward each other in such a contracted relation at opposite sides of the apertures 14, as to substantially eliminate the necessity of compressing the gasket between the conduit sections in order to assemble said sections in their approximate proper relation in a conduit installation, at least until the clamps 15 are applied thereto, and whereby the assembling operation will be expedited.

The annular chamber between the conduit sections is elliptical in cross-section, with the major axis of the ellipse being in the plane of the geometric circular center line of the chamber. The outer surface of the gasket is substantially circular in cross-section, in its normal shape, and is of a slightly greater arc than the walls of the chamber, so that, when the gasket is expanded in the chamber upon initial admittance of fluid under pressure in the conduit sections, the side-walls of the gasket will be wedged within the side-walls of the chamber and frictionally held in pressure engagement therewith irrespective of pressure of fluid in the conduit sections. Thus the gasket is rendered ineffective while the conduit sections are assembled, in order to expedite the assembling operation; is rendered effective by initial admittance of fluid under pressure in the conduit sections; and is maintained effective irrespective of pressure in the conduit sections, in order that the pressure of fluid in the sections may cease from time to time without causing a leak at the joint between the sections.

By virtue of the structure described, a simple, durable, most effective and easily assembled sealing-joint structure has been provided for conduits for conveying fluid under pressure, with said structure being of particular utility when employed in that type of a conduit installation requiring disconnection and reassembling of the conduit sections from time to time.

Having thus described my invention, I claim:

1. In joint construction for conduits for conveying fluid under pressure, including a conduit section having an end portion formed with an annular gasket-receiving recess including a wall portion forming a peripheral groove in said end portion, an internally hollowed-out gasket of resilient material with side-walls converging inwardly toward the central opening of the gasket and adapted to be stretched over said end of the conduit section and snapped into said groove, said groove being formed to cause said side-walls of the gasket to contract with respect to each other when same are snapped therein, and said conduit section having an aperture in its side-wall arranged to register with the interior of the gasket.

2. The structure as defined in claim 3, wherein the annular recess has a side-wall portion for engagement with a side-wall of the gasket, said side-wall portion, said groove portion and the gasket being cooperatively formed whereby the gasket is capable of being frictionally held in said recess in either a contracted or an expanded relation.

3. In joint construction for conduits for conveying fluid under pressure, comprising two conduit sections having adjacent ends provided with concentric annular concavities respectively forming an annular gasket-receiving chamber therebetween, an internally hollowed-out gasket of resilient material confined within the chamber and being in communication with the interior of the conduit section to cause the gasket to expand into pressure engagement with the walls of the chamber by force of pressure of fluid in the sections, and said gasket and one of the concavities being cooperatively formed whereby the gasket is capable of being frictionally held in said concavity either in a contracted or an expanded relation within the chamber.

4. In joint construction for conduits for conveying fluid under pressure, comprising two conduit sections having ends correlatively formed to provide an annular gasket-receiving chamber therebetween elliptical in cross-section with the major axis of the ellipse lying in a plane passing through the geometric circular center line of the chamber, an internally hollowed-out annular gasket of resilient material confined under compression within the chamber with the interior of the gasket being in communication with the interior of the conduits to cause the gasket to expand into pressure engagement with the walls of the chamber by force of pressure of fluid in the conduit sections, said gasket being normally crescent-shaped in cross-section with side-walls converging toward the central opening of the gasket whereby upon initial expansion of the gasket in the chamber the side-walls of the gasket will become wedged within the side-walls of the chamber and be frictionally held in pressure engagement therewith irrespective of pressure of the fluid in the conduit sections.

IVAN H. RISSER.